(12) United States Patent
Shukla et al.

(10) Patent No.: US 9,760,344 B1
(45) Date of Patent: Sep. 12, 2017

(54) RULES ENGINE HAVING AN INTERACTIVE, DUAL, SIDE-BY-SIDE DISPLAY

(71) Applicant: Bank of America Corporation, Charlotte, NC (US)

(72) Inventors: Aneesh Shukla, London (GB); Arnav Khare, London (GB); Steve Stagg, London (GB); Mark C. Dessain, London (GB); Hector Ariel Goyeneche, London (GB); Piers Thompson, London (GB)

(73) Assignee: Bank of America Corporation, Charlotte, NC (US)

( * ) Notice: Subject to any disclaimer, the term of this patent is extended or adjusted under 35 U.S.C. 154(b) by 96 days.

(21) Appl. No.: 15/050,622

(22) Filed: Feb. 23, 2016

(51) Int. Cl.
*G06F 9/44* (2006.01)
*G06F 3/0481* (2013.01)
*G06F 11/36* (2006.01)

(52) U.S. Cl.
CPC .............. *G06F 8/33* (2013.01); *G06F 3/0481* (2013.01); *G06F 8/30* (2013.01); *G06F 8/34* (2013.01); *G06F 8/73* (2013.01); *G06F 11/36* (2013.01); *G06F 2203/04803* (2013.01)

(58) Field of Classification Search
None
See application file for complete search history.

(56) References Cited

U.S. PATENT DOCUMENTS

| | | | |
|---|---|---|---|
| 6,795,832 B2 * | 9/2004 | McGeorge, Jr. .... | G06F 11/3688 |
| 6,810,232 B2 | 10/2004 | Knowles et al. | |
| 7,020,869 B2 | 3/2006 | Abrari et al. | |
| 7,912,861 B2 | 3/2011 | Weinberg et al. | |
| 8,706,820 B2 | 4/2014 | Glover et al. | |
| 8,935,654 B2 | 1/2015 | Sengupta et al. | |
| 9,053,441 B2 | 6/2015 | Sebald | |
| 9,075,737 B2 | 7/2015 | Sakai et al. | |
| 2006/0036390 A1 * | 2/2006 | Loh ..................... | G01R 31/2834 702/117 |
| 2010/0318393 A1 | 12/2010 | Acker et al. | |
| 2011/0087689 A1 * | 4/2011 | Ziegler ................... | G06Q 10/10 707/769 |
| 2012/0317541 A1 * | 12/2012 | Kaulgud ................... | G06F 8/77 717/102 |

(Continued)

*Primary Examiner* — Lewis A Bullock, Jr.
*Assistant Examiner* — Mark Gooray
(74) *Attorney, Agent, or Firm* — Weiss & Arons LLP; Michael A. Springs, Esq.

(57) ABSTRACT

A system for providing a computer language with which to write rules is provided. The system may include a rules container, a rules classes container and an engine/graph. The rules classes container may provide a code library of rules and unit test from which to inherit. The system may also include a rules GUI that may accept code of a rule in a code field window. The rules GUI may also include a documentation presentation window. The documentation presentation window may include a non-editable, reader-friendly view of the rule. Viewing the documentation window adjacent to the code field window may enable a user to understand the code and edit the code. Each rule may depend from another rule or provide a dependency for another rule. The system may save the rules into the rules container. The engine/graph may create a graph of the rules documentation based on the dependencies.

14 Claims, 9 Drawing Sheets

(56) References Cited

U.S. PATENT DOCUMENTS

| | | |
|---|---|---|
| 2014/0250427 A1 | 9/2014 | Wong et al. |
| 2015/0052092 A1 | 2/2015 | Tang et al. |
| 2015/0127411 A1 | 5/2015 | Hoen, IV et al. |
| 2015/0193332 A1 | 7/2015 | Sebald |

\* cited by examiner

FIG. 3

Window 304: Interpret Price column as a floating-point value enrichment

The EURONEXT price and quantity columns all represent the same values in different ways.
OPJ1 represents this as a string value in pence.
This rule adds a new column to OPJ1 that includes a normalized copy of the price in pounds (/100).
The value is stored as floating-point to allow the files to be correctly joined

Window 302: C:\Users\z4\Desktop\rule.py (rules.py) - Sublime Text

```
1  rules.ExtendRule(
2      name= "Interpret Price column as a floating-point value enrichment"
3      narrative= """
4      The EURONEXT price and quantity columns all represent the same values in
5      OPJ1 represents this as a string value in pence.
6      This rule adds a new column to OPJ1 that includes a normalized copy of t
7      The value is stored a floating-point to allow the files to be corrected joined
8
9
10  )
```

Update Docs

502

```
□ C:\Users\z4\Desktop\rule.py (rules.py) - Sublime Text
1  rules.ExtendRule(
2    name= "Interpret Price column as a floating-point value enrichment"
3    narrative= """
4    The EURONEXT price and quantity columns all represent the same values in
5    OPJ1 represents this as a string value in pence.
6    This rule adds a new column to OPJ1 that includes a normalized copy of t
7    The value is stored a floating-point to allow the files to be corrected
8    """,
9
10   columnName= 'Price-double',
11   columnType= 'double',
12   definition= "float(row['Price']) / 100",
13
14   givenTable= """       506
15   | Price |
16   | 10123 |      508
17   """,
18   expectedTable= """
19   | Price | (double) Price_double |
20   | 10123 |        101.23         |
21   """,
22 )
Add Tests
```

504

Interpret Price column as a floating-point value enrichment

The EURONEXT price and quantity columns all represent the same values in different ways.
OPJ1 represents this as a string value in pence.
This rule adds a new column to OPJ1 that includes a normalized copy of the price in pounds (/100).
The value is stored as floating-point to allow the files to be correctly joined

| Column Name (Data Type) |
|---|
| Price_double(double) |

| Rule |
|---|
| float(row['Price']) / 100 |

| Specification by Example | | | 510 |
|---|---|---|
| Given | | Then |
| Price | | Price_Double |
| 10123 | | 10123 |

FIG. 5

```
# Create Graph object
902  from ops.recons.trans_reporting.rules_engine.graph import RulesGraph 904  graph = RulesGraph( )

Define Rules (as shown)
906  graph.ExtendRule( ... )

# Create a rules engine object
908  rules_engine = RulesEngine(graph,  env=env)

# Run the engine
910  output_tables = rules_engine.run( )

# Get the result table
912  result = output_tables['explained']
```

FIG. 9

RULES ENGINE HAVING AN INTERACTIVE, DUAL, SIDE-BY-SIDE DISPLAY

FIELD OF THE INVENTION

This invention relates to data confirmation. More specifically, this invention relates to utilizing computer-readable rules to facilitate data confirmation and transformation.

BACKGROUND OF THE INVENTION

Typically, in a data transformation, data confirmation and/or data reconciliation, data to be transformed, confirmed and/or reconciled is provided in several tables. In order to transform, confirm and/or reconcile the data, the data may require transformation before performing a match from a data element in one data set to a data element in another data set. For the purposes of this application, performing a match may be understood to be comparing a data element from a first data set to a second data element from a second data set and, when the first data set is deemed to be equivalent to the second data element performing a match.

For example, a data element stored with three decimal place values may be incomparable to a corresponding data element stored with four decimal place values. Therefore, one data set—preferably, the four-decimal place data set—may require transformation—e.g., truncating—prior to performing a match. These transformations require careful documentation and structuring. The transformation documentation and structuring may enable stakeholders and/or external reviewers to understand the intent of the underlying source code without requiring them to read the source code directly.

A developer may create documentation corresponding to a source code element. The documentation may provide source code information to a non-developer. A non-developer may read the documentation and thereby understand the contents of the source code. Although many developers prepare documentation while writing source code, most developers fail to appropriately update the documentation when updating the source code. Many times, however, documentation becomes outdated shortly after the associated source code is implemented, or put into use. Outdated documentation may mislead documentation viewers.

Therefore, there is a need for a library where discrete documentation is fundamentally linked to each source code element. If documentation is interconnected with a source code element, or auto-entered via a source code element, it may be updated continually.

SUMMARY OF THE DISCLOSURE

A system for providing a computer language with which to write rules is provided. The system may include a rules container. The system may include a rules classes container. The rules classes container may provide a code library of legacy rules and unit tests from which to inherit.

The system may also include a rules GUI. The rules GUI may include a code field window. The code field window may accept code of a rule. The code field window may include an editable name field. The editable name field may accept code corresponding to a name of a rule. The code field window may also include an editable narrative field. The editable narrative field may accept code corresponding to a description of the rule. The code field window may also include an editable rule field. The editable rule field may accept code corresponding to a logic of the rule. The code field window may also include an editable unit test field. The editable unit test field may accept code corresponding to at least one unit test. The unit test may correspond to the logic associated with the rule.

The GUI may also include a documentation presentation window. The documentation presentation window may be displayed side by side with the code window. The documentation presentation window may display documentation corresponding to the name field and the narrative field. The documentation presentation window may also display documentation corresponding to the logic of the rule and the unit tests of the rule.

The documentation may include the name of the rule displayed in a non-editable format. The documentation may also include the narrative of the rule displayed in a non-editable format. The documentation may also include the logic of the rule displayed in a non-editable format. The documentation may also include the unit test displayed in a non-editable format.

The system may be configured to check if the rule, included in the code window, contains a name in the name field and a narrative in the narrative field. The checking may be performed upon receipt of code of a rule in the code window.

In some embodiments, the system may be configured to check if the rule contains logic in the rule-logic field and unit test(s) in the unit test field.

In the event that the narrative field contains a minimum number of characters, a minimum number of words and minimum number of sentences, the system may be configured to save the rule into the rules container.

In the event that the narrative field contains less that the minimum number of characters, less than the minimum number of words or less than the minimum number of sentences, the system may be configured to provide an incomplete message to a user and disable the user's ability to save the rule.

The system may also be configured to receive a plurality of rules. The system may save the plurality of rules into the rules container. Each rule in the plurality of rules may depend from another rule in the plurality of rules. Each rule may provide a dependency for another rule in the plurality of rules. When a rule depends from another rule, the logic of the second rule may be contingent on the logic of the first rule.

The system may also include an engine. The engine may enable production of a graph of the plurality of rules. The graph may include the documentation of each rule. The graph may also include a graphical display of a rules hierarchy. Each rule, included in the plurality of rules may be included in the graph.

The system may also include a join capability. The join capability may enable the user to join two rules together. The joint rule may execute the logic of both rules on a set of data.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 3 shows another illustrative GUI of an embodiment of the invention;

FIG. 5 shows yet another illustrative GUI of an embodiment of the invention;

FIG. 9 shows illustrative computer-readable code of an embodiment of the invention.

DETAILED DESCRIPTION OF THE DISCLOSURE

Figure 1:
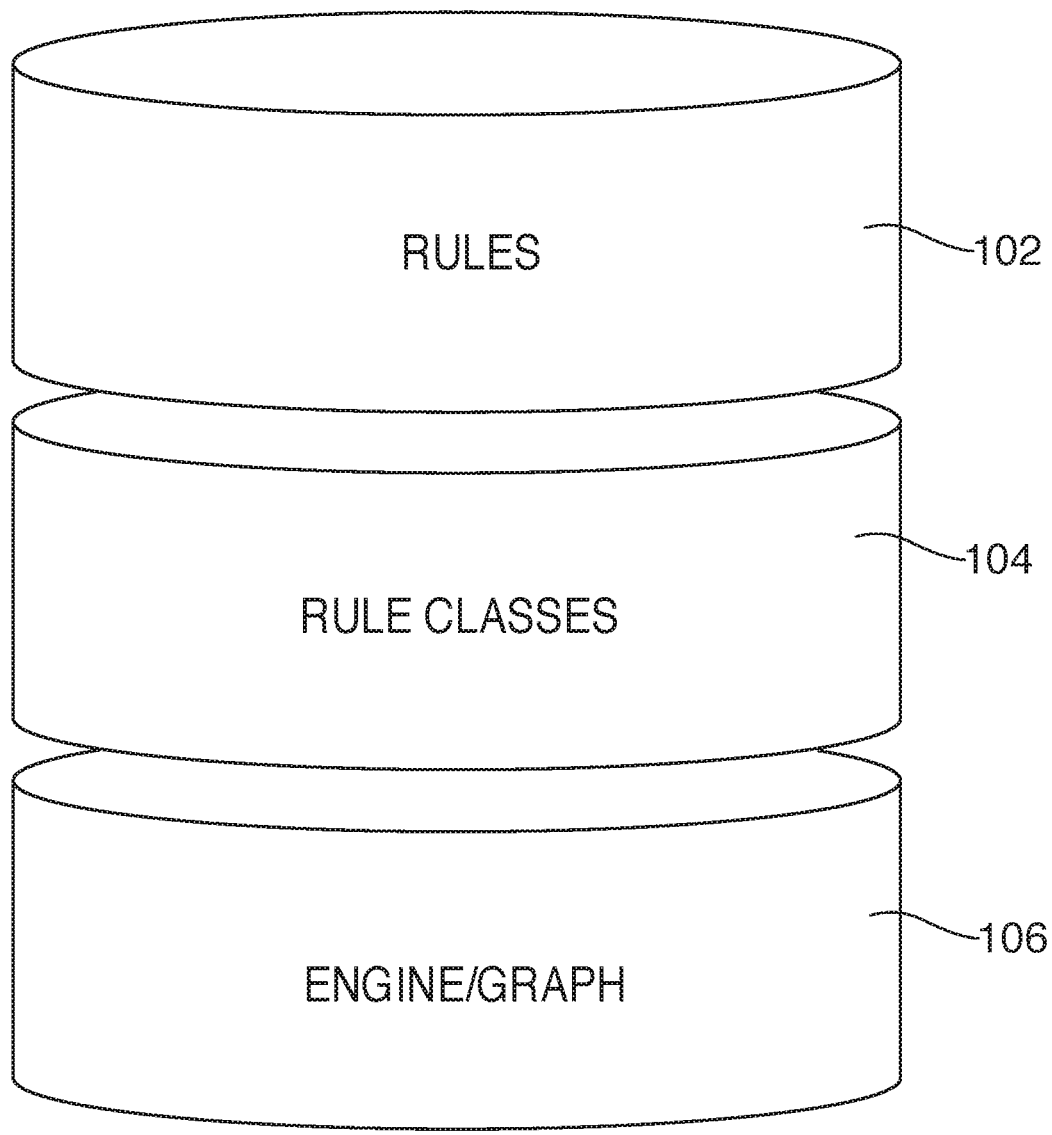
FIG. 1 shows an illustrative diagram of an embodiment of the invention.

In a data reconciliation, one set of data may require transformation and/or manipulation in order to match another set of data. A computer-readable rule may enable transformation and/or manipulation of a set of data. The rule may be executed on the data set. Upon completion of the execution of the rule, the data set may be transformed into a data set ready for data reconciliation.

The rule may include logic. The logic may include instructions for transformation of the data. Some examples of logic elements may include rounding each data element to the second decimal place, multiplying each data element by 0.01, dividing each data element by 100 or any other suitable logic element.

The rule may also include unit tests. A unit test may be a code element. The unit test may enable a user to test a specific functionality of the rule. The unit test may ensure that the rule is operational and accurate.

A user may store the rule in a rules container. The rules container may serve as a storage for the rule. The user may retrieve the rule from the rules container. The rules container may also contain a plurality of rules.

At times, a user may wish to build a rule based on another rule. Also, a user may wish to build a unit test based on another unit test. These rules and unit tests may have been created by another user. These rules and unit tests may be included in a code library. To facilitate retrieval of the rules and unit tests, the system may include a container that holds rules, unit tests, libraries and any other suitable computer-readable code. The container may be a rules classes container. The rules classes container may include rules, unit tests and other computer-readable code.

A user may inherit the rules, unit test and/or other computer-readable code. For the purposes of this application, inheritance may be understood to mean incorporating code from the rules classes container into a rule. In order to incorporate the rule, a user may be required to enter a code line that includes the language "extends". The word "extends", or any other suitable word, may notify the system to incorporate the referenced code into the rule.

Each rule may perform a specific function. At times, a user may require execution of a plurality of rules in a specific sequence in order to achieve the required function. The user may want to connect the plurality of rules in a specific order. Therefore, a user may include dependencies in each rule. Each rule may depend from another rule. Some rules may create a dependency for other rules.

The plurality of rules may be executed on a data set. Initially, a first rule may be performed on the data set. Upon completion of the first rule, a second rule, which may depend from the first rule, may be performed on the data set. This may occur until n number of rules are completed.

A rules engine may enable a user to view a rule dependency graph. The rules engine may pull substantially all connected rules from the rules container. The rules engine may create a graph. The graph may include each rule and its dependencies. Each rule may be represented on the graph with its documentation.

A method for providing a computer language with which to write rules is provided. The method may include accepting name code in an editable name field. The name code may correspond to a name of rule. The editable name field may be included in a code field window of a rules GUI.

The method may also include accepting narrative code in an editable narrative field. The narrative code may correspond to a narrative of the rule. The editable narrative field may be included in the code field window of the rules GUI.

The method may also include accepting rule-logic code in an editable rule field. The rule-logic code may correspond to a logic of the rule. The editable rule-logic field may be included in the code field window of the rules GUI.

The method may also include accepting unit test code in an editable unit test code field. The unit test code may correspond to at least one unit test of the rule. The editable test field may be included in the code field window of the rules GUI.

The method may also include displaying the non-editable documentation in a documentation presentation window. The documentation may correspond to the name field, the narrative field, the rule-logic field and the unit test field. The documentation presentation window may be situated adjacent to the code field window.

In some embodiments, when a user's screen may be small, a user may toggle between viewing the rules code window and the documentation presentation window.

The method may include inspecting the code of the rule upon receipt of code of a rule in the code field window. The inspecting may include inspecting the number of characters, the number of words and the number of sentences of the name in the name field. The inspecting may also include inspecting the number of characters, the number of words and the number of sentences of the narrative in the narrative field.

The method may include saving the rule into a rules container. The saving may occur when the narrative field, the name field or any other suitable field includes a minimum number of characters, a minimum number of words and a minimum number of sentences.

The method may include providing an incomplete message to a user and temporarily disabling the user's ability to save the rule when the narrative field contains less than the minimum number of characters, less than the minimum number of words or less than the minimum number of sentences.

The method may also include wherein the user's ability to save the rule is temporarily disabled until the narrative field contains the minimum number of words and the minimum number of sentences.

The method may also include receiving a plurality of rules. The method may also include saving the plurality of rules into the rules container. Each rule, included in the plurality of rules, may depend from another rule in the plurality of rules. Each rule, included in the plurality of rules, may provide a dependency to another rule in the plurality of rule.

The method may also include producing, via an engine, a graph of the plurality of rules. The graph may be based on the dependencies. The graph may include documentation of each rule and a graphical display of a rules hierarchy. Each rule, included in the plurality of rules, may be included in the graph.

The method may include a join capability. The join capability may enable creation of a single joined rule from two rules.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 shows a hierarchal storage diagram.

Rules classes container 104 may include a code library. The code library may include unit tests. Unit tests may be code elements included in each code section. The unit tests may enable a user to test the functionality of a single code section. The code library may include rule classes from which to inherit. Inheriting a rule class may be understood to mean utilizing a rule class from the code library as a building block for the creation of a second rule.

Each rule class may implement an operation that can be performed on a set of data or a table. Each rule class may accept configuration information into an initialization module ("init"). Examples of configuration information may be: which columns in a table to extend, the logic used to extend columns, etc.

Rule classes may implement a method to perform a transformation on a set of data or table. A transformation method be included in substantially all rule classes. Each transformation method, in each rule, may have the same name, for example, "runRule". Regulating the name of the transformation method may enable a user to utilize the method of the rule without viewing the rule class itself. Each rule class may also be able to generate documentation metadata for each rule.

The code library may be modular. The code library may also be reusable. For example, each code element can be reused in one project or across a variety of projects.

Rules container 102 may include instances of a variety of rule classes. An instance of a rule class may be a copy of code of a rule. Each rule, or instance of a rule class, may contain substantially all the information required to perform a transformation. Each rule may declare its dependency tree—i.e., each rule may declare the tables from which the rule depends and the tables which depend on the rule. The dependency information may be stored as strings. The dependency information may be used to generate a graph.

Each rule may depend on or produce tables. A table may be understood to mean a name for a set of data during a processing state. A table may be connections between rules. A table may control the scope of a single instance of running of an engine. A table may inject data into the graph. A table may be called a table because, typically, it represents tabular data as it is being processed through the graph.

A rule may be a business rule. One example of a rule may be changing a price in cents to a price in dollars. Another example of a rule may be calculating workdays for a specific week in a year. Another example of a rule may be calculating tax of an item to be purchased.

Engine/Graph 106 may include an engine and a graph. All rules may be created from a graph object. When a rule is associated with a graph object, the rule is said to be "owned" by the graph object. Each rule can only belong to one graph object. To increase clarity, each graph should include as many rules as possible.

The engine may be responsible for running the rules in a graph. The engine may include logic for running a minimal subset of the graph. The minimal subset of the graph may be required to generate named output tables. Input tables may also be provided to the engine. Input tables may further restrict which rules are run.

Figure 2:
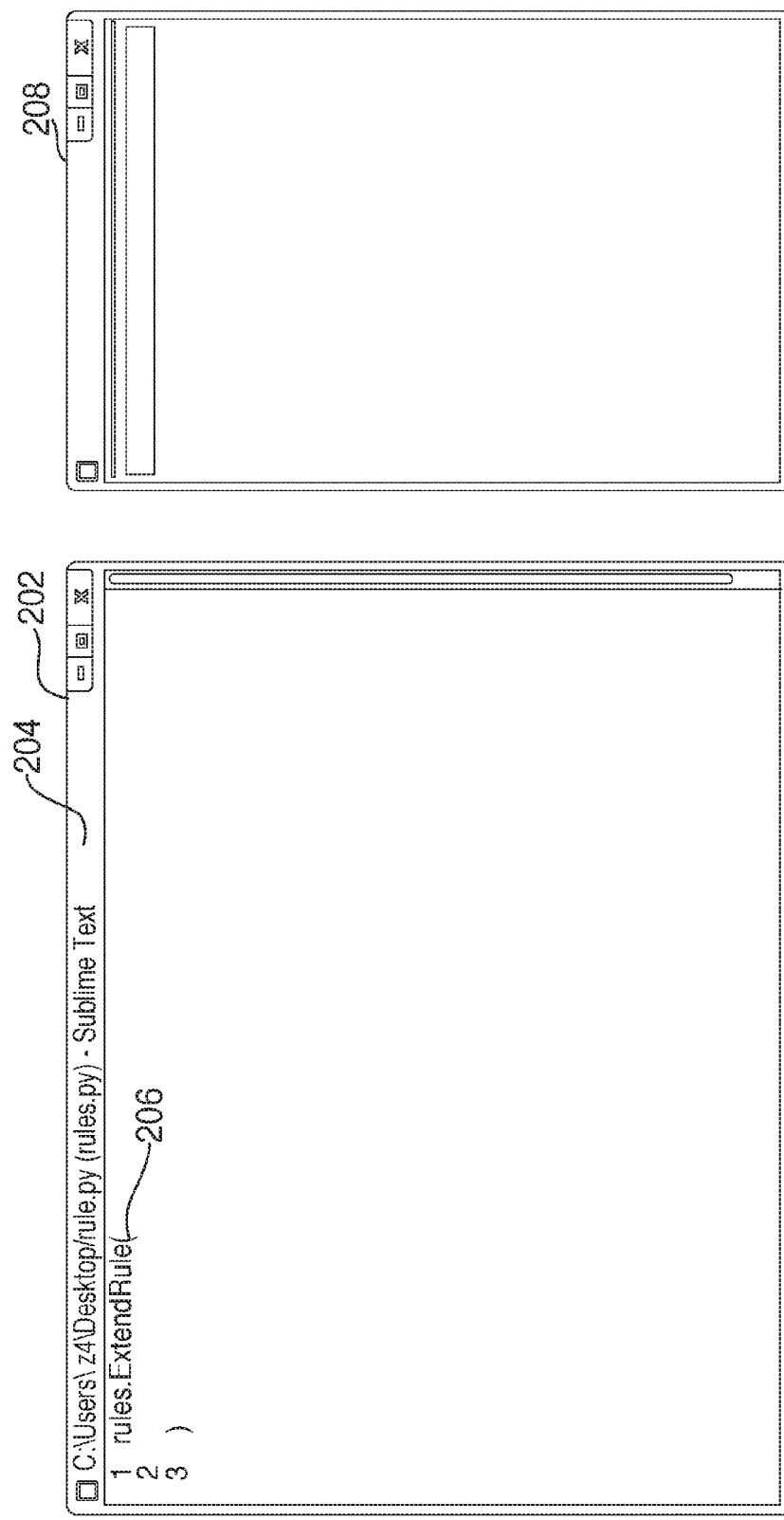
FIG. 2 shows an illustrative graphical user interface ("GUI") of an embodiment of the invention.

FIG. 2 shows rule code window 202 and documentation window 208. The rule, included in the rule code window, may be saved as a Python™ file, as shown at 204. Any other suitable computer-readable language code may also be utilized. A user may have typed "rules.ExtendRule" into rule code window 202. By utilizing the method "ExtendRule", the user may pull exemplary rule code, which may form the basis of the rule, from a library, or rules classes container.

FIG. 3 shows rule code window 302 and documentation window 304. A user may have created a name field and a narrative field. The user may have entered a name into the name field and a narrative into the narrative field. The name may be a name of the rule. The narrative may be a narrative of the rule. Documentation window 304 may display both the name and the narrative in a manner which enables a viewer to understand the purpose of the rule. The side-by-side layout of rule code window 302 and documentation window 304 may enable a viewer, who is unfamiliar with computer-readable code to view the documentation and the computer-readable code together, and thereby understand how to alter the computer-readable code to suit his or her needs.

Figure 4:
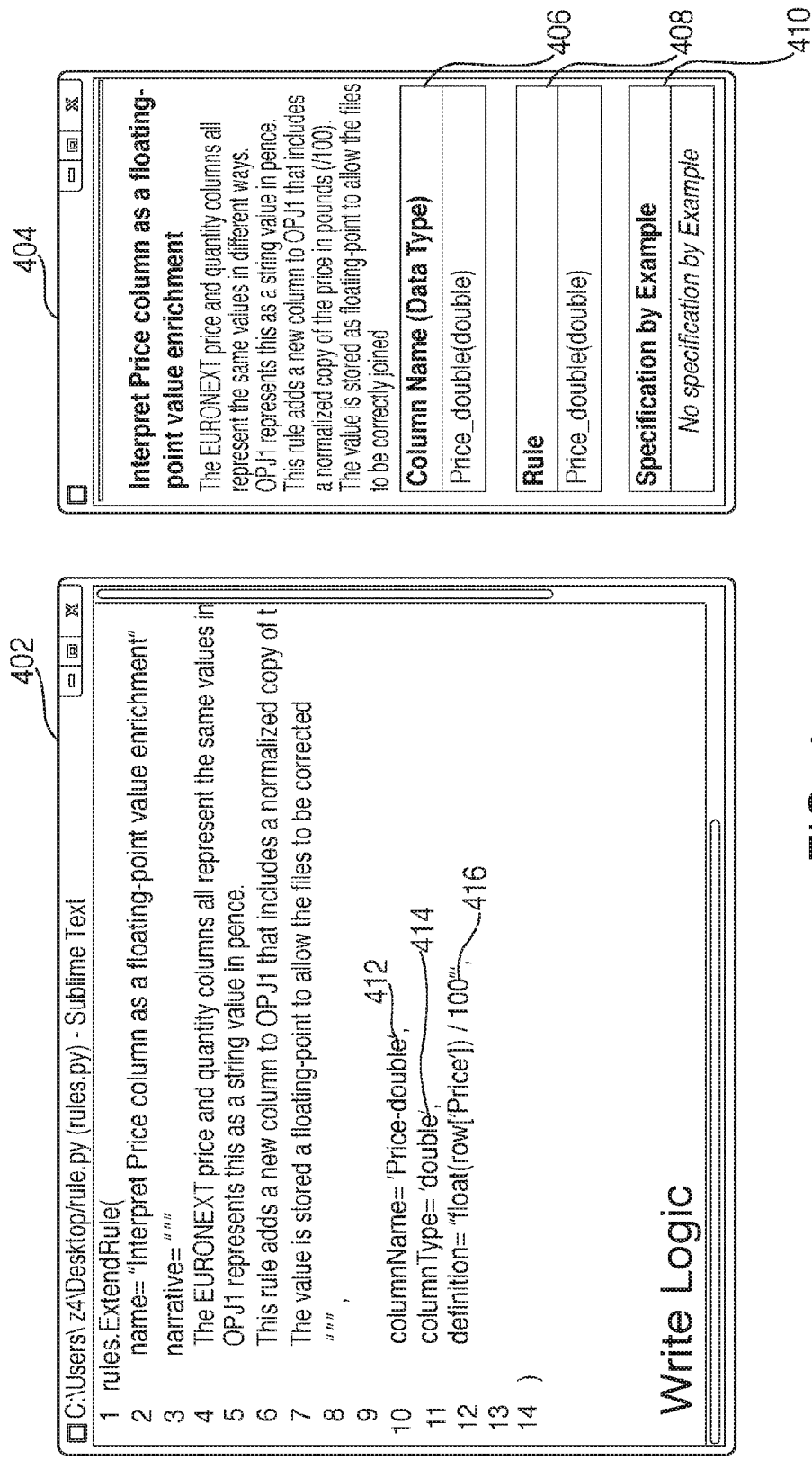
FIG. 4 shows still another illustrative GUI of an embodiment of the invention.

FIG. 4 shows rule code window 402 and documentation window 404. Rule code window 402 may include column name field 412, column type field 414 and definition field 416. The rule may be utilized to manipulate a table, or data set, as described above. Therefore, the rule may refer to a column name to be included in the table. The manipulation executed by the rule may create a new column name: Price_double. The type of column Price_double may be double, as shown at 414—i.e., a number that can include decimal places. It should be noted that a double may utilize more memory than an integer variable type. This may be because an integer variable type may not include decimal place values, while a double variable type may include decimal place values. Definition field 416 may be the definition of the rule. The definition of the rule may be float(row['Price'])/100. The rule may require transforming the prices into a float (a different integer type) and dividing the result by one hundred. This rule may convert a value from English pounds to English pence. This data may be stored in column Price_double.

The documentation may show the new column name at 406. The documentation may also show the rule at 408. The documentation may also show specification by example, which is not provided as of FIG. 4, as shown at 410.

FIG. 5 shows rule code window 502 and documentation window 504. FIG. 5 shows the addition of a unit test to the code. The unit test may include a simulated given table, as shown at 506. The unit test may also include a simulated expected table, as shown at 508. The user may be shown the test result in documentation window 504, as shown at 510.

If the test result is correct, the viewer may understand that the rule performs properly. If the test result is incorrect, the user may understand the need to alter the rule to ensure accuracy of the rule. The user can simply change the typed code in the rule code window 502.

Figure 6:
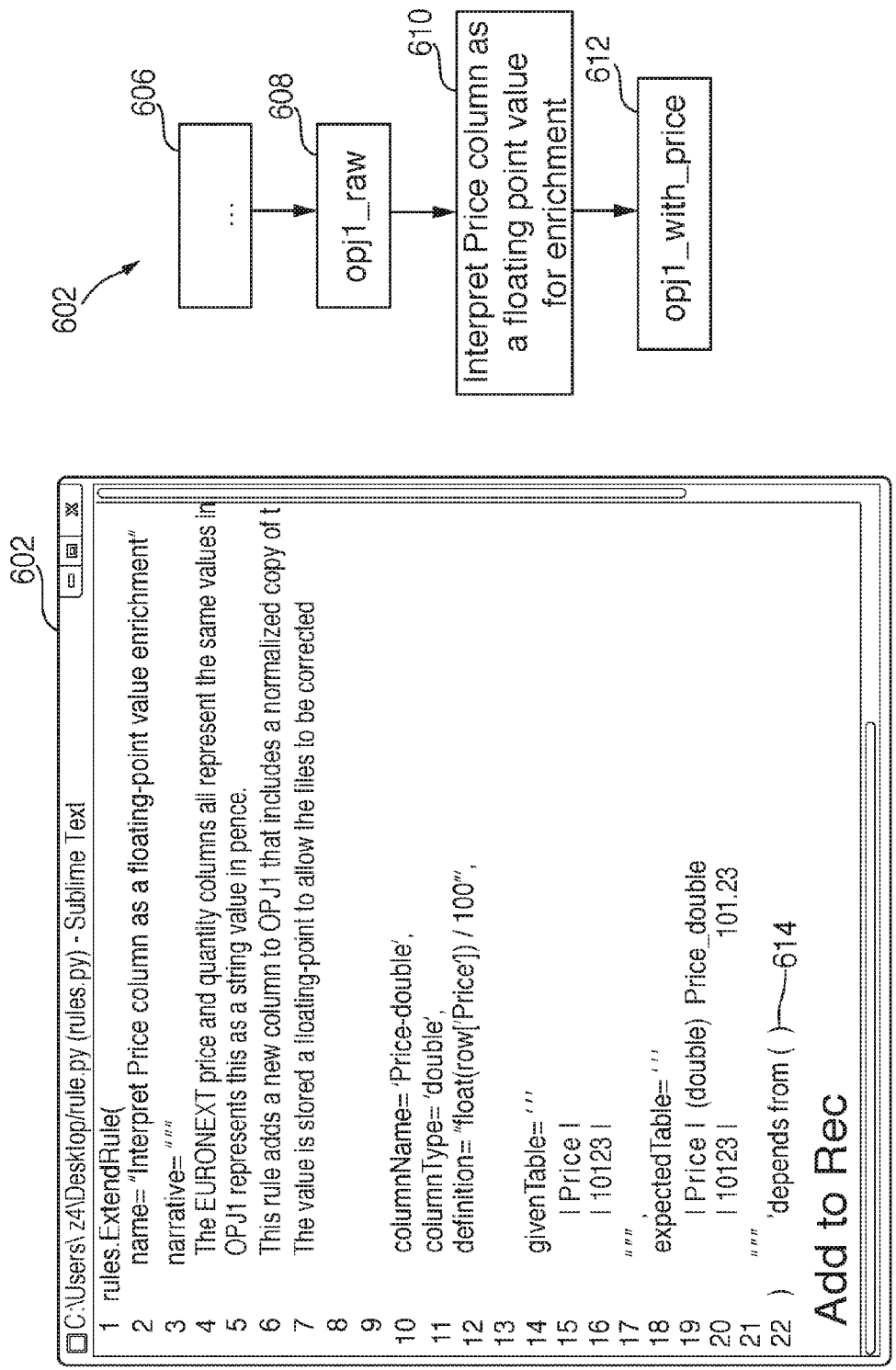
FIG. 6 shows still another illustrative GUI of an embodiment of the invention

FIG. 6 shows rule code window 602 and documentation 604. Rule code window 602 may include a dependency. The rule, shown in window 602, may depend from another rule. The rule, shown in window 602 may be performed on a data set upon completion of the previous rule. Documentation 604 shows a graph of the rules. Rule opj1 with price (612) may include the narrative "Interpret Price column as a floating-point value for enrichment" (610). Rule 612 may depend from opj1 with price (608). Rule 608 may include the documentation 606.

According to some embodiments, a variety of exemplary graphs may be produced by the rules engine. Each graph may include hierarchy of rules. Each rule in the graph may be represented by its documentation, name, narrative or any other suitable defining factor. A rules graph that includes the documentation of each rule may enable a viewer to properly understand the diagram flow and the functionality of each of the rules.

Figure 7:
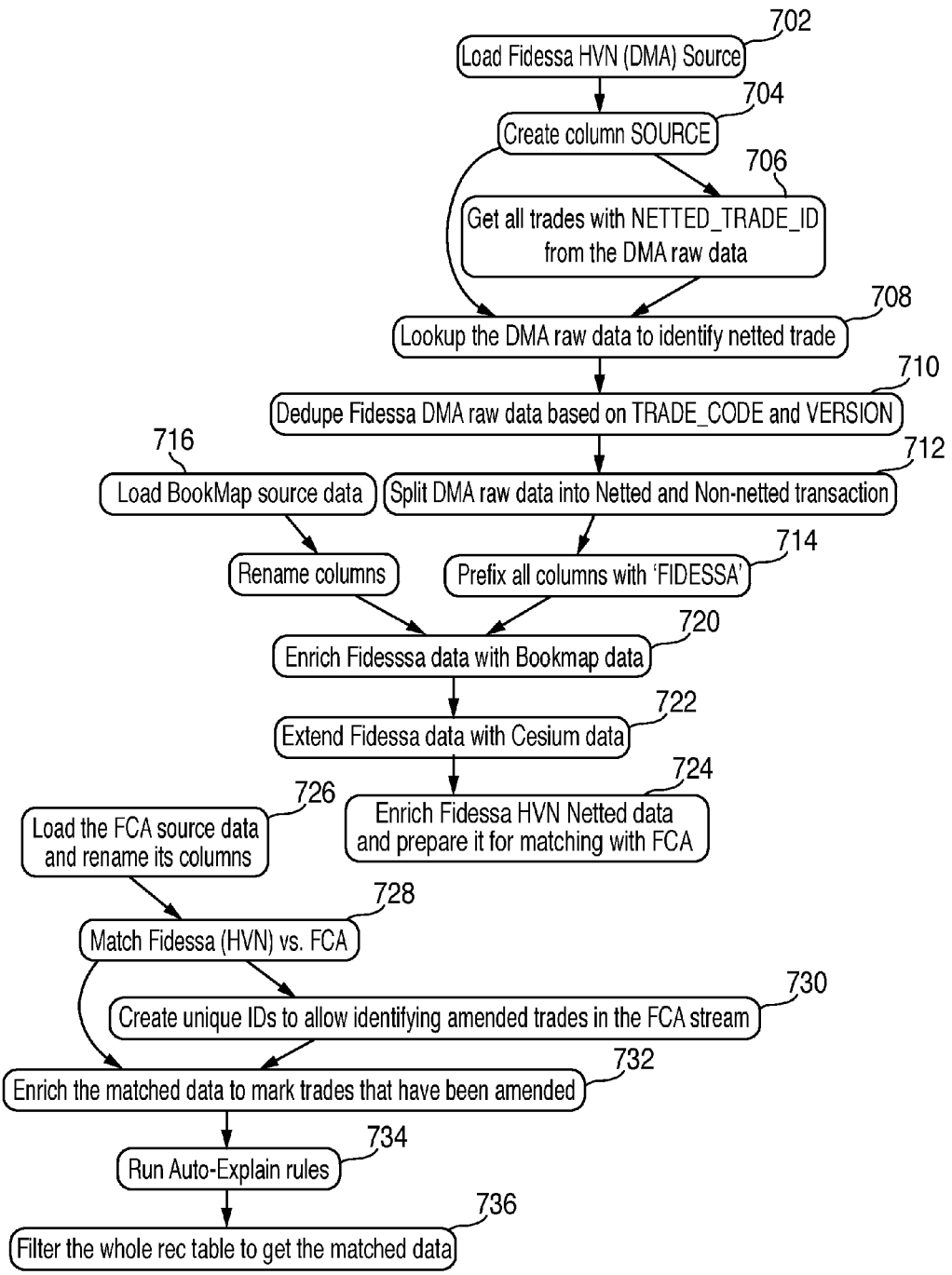
FIG. 7 shows illustrative documentation of an embodiment of the invention.

FIG. 7 shows a graph. The graph may have been generated by a rules engine. The graph shown in FIG. 7 may relate to trading systems. The graph shown in FIG. 7 may be a relatively high level graph—i.e., each element of the flow chart may represent one rule or a plurality of rules. The graph may be called a user interface graph because it may be user friendly. A user who would like to review the documentation associated with each rule may click on a flow chart element. Clicking on a flow chart element may open the documentation associated with the rule or plurality of rules associated with the flow chart element.

Step 702 shows loading Fidessa HVN (DMA) Source. For the purposes of this application, Fidessa may be a trading system, HVN may represent high volume netting and DMA may represent direct market access. Step 702 may be understood to mean loading a file produced by the HVN system into memory.

Step 704 shows creating a column named source. The source column may be a first column in a table. Step 706 shows getting all the trades with a netted trade identification number from the DMA raw data. Step 708 shows looking up the DMA raw data to identify the netted trades. Steps 706 and 708 may work together in a similar manner to SQL self-join or self-lookup.

Step 710 shows removing duplicates from Fidessa DMA raw data. The system may determine duplicates based on trade code and version. Step 712 shows splitting DMA raw data into netted and non-netted transactions. This step may remove the non-netted transactions from the list. Step 714 shows prefixing each column with the title—"Fidessa". Any other suitable title may be used.

Step 716 shows loading bookmap source data. Bookmap source data may keep data about trading books in an entity. Step 718 shows renaming the columns of the bookmap source data. Step 720 shows enriching Fidessa data with bookmap data. This may mean combining the bookmap data with the Fidessa data, and, as a result, each Fidessa data element may also contain appropriate bookmap data.

Step 722 shows extending Fidessa data with Cesium data. Step 724 shows enriching Fidessa HVN netted data and preparing the data for matching with FCA. Step 726 shows loading the FCA source data and renaming the columns of the FCA source data. Step 728 shows matching the Fidessa (HVN) data with respect to FCA data. Step 730 shows creating unique identifiers to allow identifying amended trades in the FCA stream. Step 732 shows enriching the matched data to mark trades that have been amended. Step 734 shows running auto-explain on the rules. Step 736 shows filtering the entire table to retrieve the matched data.

Figure 8:
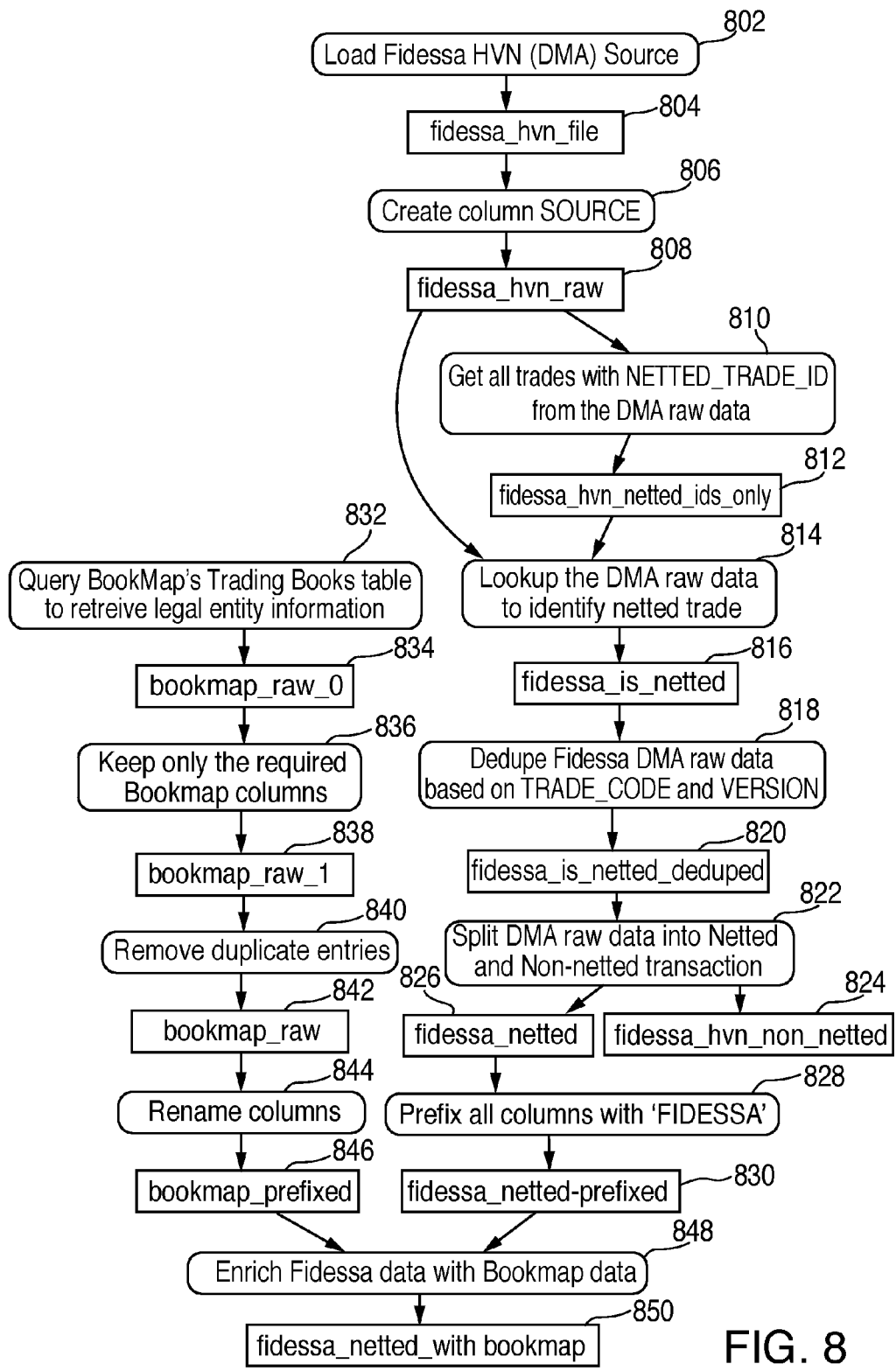
FIG. 8 shows additional illustrative documentation of an embodiment of the invention.

FIG. 8 shows a graph relating to the same process as FIG. 7. The graph shown in FIG. 8 is a developer graph as opposed to a user interface graph. The graph shown in FIG. 8 may show substantially all tables and all rules. A user may select a flow chart element in order to view the documentation of the rule. A user viewing the graph may be able to insert a new rule into the right place—i.e., with the appropriate dependencies.

Step 802 shows loading Fidessa DN (DMA) source data. Table 804—"fidessa_hvn_file" may be the table created from step 802.

Step 806 may show creating a column called source. Table 808—"fidessa_hvn_raw" may be the table created from step 806.

Step 810 may show getting all trades with a netted trade identification number from the DMA raw data. Table 812—"fidessa_hvn_netted_ids_only" may be the table created from step 810.

Step 814 may show looking up the DMA raw data to identify the netted trades. Table 816—"fidessa_is_netted" may be the table created from step 814. Table 816 may include only the netted trades. Table 816 may be a positive retrieval of the netted trades. Each trade that is netted may be flagged. The non-flagged trades may not be removed until a later rule.

Step 818 may show removing duplicates from Fidessa DMA raw data. The duplicate removal may be based on trade_code and version. Table 820—"fidessa_is_netted_deduped" may be produced from step 818. Table 820 may include the netted trades with duplicates removed.

Step 822 shows splitting DMA raw data into netted and non-netted transactions. Step 822 may include creating a "fidessa_netted" table—826 and creating a "fidessa_hvn_non_netted" table—824. Step 822 may include dividing out the non-netted trades based on the flagging performed earlier at step 814. Step 822 may produce two tables—one which includes only the netted trades and one which does not include the netted trades.

Step 828 shows prefixing all the columns in table 826 with "FIDESSA". Table 830—"fidessa_netted_prefixed" may be produced by step 828.

Step 832 shows querying Bookmap's trading books table to retrieve legal entity information. Table 834 may be the retrieval of raw bookmap feeds. Step 836 shows keeping only the required bookmap columns. Table 838—"bookmap_raw_1" may be produced by step 836. Step 840 shows removing duplicate entries. Table 842—"bookmap_raw" may be produced by step 840.

Step 844 may be renaming the columns. Table 846—"bookmap_prefixed" may be produced by step 844. Step 848 shows enriching Fidessa data with bookmap data. Table 850—"fidessa_netted_with_bookmap" may be produced by step 848.

FIG. 9 shows an exemplary process flow. Initially, a user may create a graph object (902). The user may import a RulesGraph class from a library. The RulesGraph may enable a user to utilize the rules graph code. The user may copy the imported rules graph into the graph object (904). A user may then define the rules of the graph, as shown above (906). A user may then create a rules engine object (908). The rules engine object may accept a graph and any other suitable parameter. The user may then run the engine (910). The user may call the run method of the rules engine to run the engine. The user may retrieve the result table (912). The user may insert the result table into an output table or other output format. The output format may enable a user to properly view the graph.

Thus, methods and apparatus for a rules engine have been provided. Persons skilled in the art will appreciate that the present invention can be practiced by other than the described embodiments, which are presented for purposes of illustration rather than of limitation, and that the present invention is limited only by the claims that follow.

What is claimed is:

1. A system for providing a computer language with which to write rules, the system comprising:
    a rules container;
    a rules classes container that provides a code library of rules and unit tests from which to inherit;
    a rules graphical user interface ("GUI"), wherein the rules GUI comprises:
        a code field window, which accepts code of a rule, said code field window comprising:
            an editable name field that accepts code corresponding to a name of a rule;
            an editable narrative field that accepts code corresponding to a description of the rule;
            a an editable rule field that accepts code corresponding to a logic of the rule;
            an editable unit test field that accepts code corresponding at least one unit test corresponding to the logic of the rule;
        a documentation presentation window, displayed side by side with the code window, which displays documentation corresponding to the name field and the narrative field, said documentation comprising:
            the name of the rule displayed in a non-editable format;
            the narrative of the rule displayed in a non-editable format;
            the logic of the rule displayed in a non-editable format; and
            the at least one unit test displayed in a non-editable format;
        upon receipt of code a rule in the code window, the system is configured to check if the rule, included in the code window, contains a name in the name field and a narrative in the narrative field; and
        in the event that the narrative field contain a minimum number of characters, a minimum number of words and a minimum number of sentences, the system is configured to automatically enable a user's ability to save the rule into the rules container;
        in the event that the narrative field contains less than the minimum number of characters, less than the minimum number of words or less then the minimum number of sentences, the system is configured to provide an incomplete message to a user and disable the user's ability to save the rule.

2. The system of claim 1, wherein the system is configured to receive a plurality of rules and save the plurality of rules into the rules container.

3. The system of claim 2, wherein each rule, in the plurality of rules, depends either from another rule in the plurality of rules, or provides a dependency to another rule in the plurality of rules.

4. The system of claim 3, further comprising an engine which enables production of a graph of the plurality of rules.

5. The system of claim 4, wherein the graph comprises the documentation of each rule and a graphical display of a rules hierarchy.

6. The system of claim 5, wherein each rule, included in the plurality of rules, is included in the graph.

7. The system of claim 1, further comprising a join capability, said join capability enables the user to join two rules together.

8. A method for providing a computer language with which to write rules, the method comprising:
    accepting name code, said name code corresponding to a name of a rule, in an editable name field included in a code field window of a rules graphical user interface ("GUI");
    accepting narrative code, said narrative code corresponding to a narrative of the rule, in an editable narrative field included in the code field window of the rules GUI;
    accepting rule-logic code, said rule-logic code corresponding to a logic of the rule, in an editable rule field included in the code field window of the rules GUI;
    accepting unit test code, said unit test code corresponding to a logic of the rule, in an editable unit test field included in the code field window of the rules GUI;
    displaying non-editable documentation in a documentation presentation window, said documentation corresponding to the name field, the narrative field, the rule-logic field and the unit test field, said documentation presentation window situated adjacent to the code field window;
    upon receipt of code of a rule in the code field window, inspecting the code of the rule, the inspecting comprising:
        inspecting the number of characters, the number of words and the number of sentences of the name in the name field; and
        inspecting the number of characters, the number of words and the number of sentences of the narrative in the narrative field;
    automatically enabling a user's ability to save the rule, into a rules container, when the narrative field includes a minimum number of characters, a minimum number of words and a minimum number of sentences; and
    providing an incomplete message to a user and temporarily disabling a user's ability to save the rule when the narrative field contains less than the minimum number of characters, less than the minimum number of words or less than the minimum number of sentences;
    wherein the user's ability to save the rule is temporarily disabled until the narrative field contains the minimum number of characters, the minimum number of words and the minimum number of sentences.

9. The method of claim 8, wherein the method further comprises receiving a plurality of rules and saving the plurality of rules into the rules container.

10. The method of claim 9, wherein each rule, included in the plurality of rules, depends from another rule in the plurality of rules, or provides a dependency to another rule in the plurality of rules.

11. The method of claim 10, further comprising producing, via an engine, a graph of the plurality of rules.

12. The method of claim 11, wherein the graph comprises the documentation of each rule and a graphical display of a rules hierarchy.

13. The method of claim 12, wherein each rule, included in the plurality of rules, is included in the graph.

14. The method of claim 8, further comprising creating a single joined rule by enabling the user to join two rules together.

* * * * *